United States Patent
Engerman (10) Patent No.: US 11,913,535 B2
(45) Date of Patent: Feb. 27, 2024

(54) VEHICLE PRODUCT LINE WITH MULTIPLE GEAR TRAIN ASSEMBLIES

(71) Applicant: Dana Automotive Systems Group, LLC, Maumee, OH (US)

(72) Inventor: Eric M. Engerman, Plymouth, MI (US)

(73) Assignee: DANA AUTOMOTIVE SYSTEMS GROUP, LLC, Maumee, OH (US)

(*) Notice: Subject to any disclaimer, the term of this patent is extended or adjusted under 35 U.S.C. 154(b) by 0 days.

(21) Appl. No.: 17/816,676

(22) Filed: Aug. 1, 2022

(65) Prior Publication Data

US 2022/0364637 A1 Nov. 17, 2022

Related U.S. Application Data

(63) Continuation of application No. 17/103,817, filed on Nov. 24, 2020, now Pat. No. 11,448,305.

(51) Int. Cl.
| | |
|---|---|
| *F16H 57/023* | (2012.01) |
| *F16H 57/021* | (2012.01) |
| *F16H 57/037* | (2012.01) |
| *F16H 57/02* | (2012.01) |
| *F16H 57/00* | (2012.01) |

(52) U.S. Cl.
CPC ......... *F16H 57/023* (2013.01); *F16H 57/021* (2013.01); *F16H 57/037* (2013.01); *F16H 2057/005* (2013.01); *F16H 2057/02034* (2013.01)

(58) Field of Classification Search
CPC .... F16H 57/023; F16H 57/021; F16H 57/037; F16H 2057/005; F16H 2057/02034
See application file for complete search history.

(56) References Cited

U.S. PATENT DOCUMENTS

| | | | | |
|---|---|---|---|---|
| 741,931 | A * | 10/1903 | Sandell | F16H 48/08 475/230 |
| 3,029,661 | A * | 4/1962 | Schmitter | F16H 1/22 184/6.12 |
| 5,743,348 | A * | 4/1998 | Coppola | F16H 63/3416 180/65.6 |
| 6,634,247 | B2 | 10/2003 | Pels et al. | |
| 7,399,248 | B2 * | 7/2008 | Kleinhans | F16H 48/24 475/236 |
| 8,827,030 | B1 * | 9/2014 | Strenge | A63H 17/26 180/374 |

(Continued)

FOREIGN PATENT DOCUMENTS

GB 2122146 A * 1/1984 ......... B60B 27/0031

OTHER PUBLICATIONS

Yao, Q., "Multi-objective optimization design of spur gear based on NSGA-II and decision making," Advances in Mechanical Engineering, vol. 11, No. 3, Mar. 13, 2019, 8 pages.

Primary Examiner — Thomas C Diaz
(74) Attorney, Agent, or Firm — McCoy Russell LLP (57) ABSTRACT

A line of vehicle transmissions is provided. The vehicle line includes a first multi-stage gear train assembly with at least two stages, a second multi-stage gear train assembly with at least three stages, and a housing including a first section removably attached to a second section. The second housing section is configured to receive the first and second multi-stage gear train assemblies in different product arrangements.

20 Claims, 5 Drawing Sheets

(56) References Cited

U.S. PATENT DOCUMENTS

| | | |
|---|---|---|
| 9,789,754 B2 | 10/2017 | Zhu et al. |
| 9,951,851 B2 | 4/2018 | Valesh |
| 10,167,944 B2 | 1/2019 | Kwasniewski et al. |
| 10,862,377 B2 | 12/2020 | Ogino et al. |
| 11,054,018 B2 | 7/2021 | Hori |
| 11,421,774 B2* | 8/2022 | Tamura ................. F16H 57/031 |
| 2005/0284244 A1 | 12/2005 | Fuhrer et al. |
| 2007/0049452 A1* | 3/2007 | Carter .................... F16H 48/08 |
| | | 475/220 |
| 2018/0345786 A1 | 12/2018 | Kucharski |
| 2019/0078675 A1 | 3/2019 | Slesinski et al. |
| 2020/0032895 A1 | 1/2020 | Kiyokami et al. |
| 2021/0138885 A1 | 5/2021 | Engerman |
| 2022/0274484 A1* | 9/2022 | Jinnai ....................... F16H 1/06 |

\* cited by examiner

VEHICLE PRODUCT LINE WITH MULTIPLE GEAR TRAIN ASSEMBLIES

CROSS REFERENCE TO RELATED APPLICATION

The present application is a continuation of U.S. Non-Provisional patent application Ser. No. 17/103,817, entitled "VEHICLE PRODUCT LINE WITH MULTIPLE GEAR TRAIN ASSEMBLIES", and filed on Nov. 24, 2020. The entire contents of the above-listed application are hereby incorporated by reference for all purposes.

TECHNICAL FIELD

The present disclosure relates to a vehicle powertrain line with a plurality of gear train assemblies.

BACKGROUND AND SUMMARY

In vehicle design processes, production cost is an ever-present factor. Certain vehicle powertrain platforms may have varied gear ratio targets that serve different end-use performance objectives. Thus, to meet the different gear ratio design goals, the ratio of the gearbox stages may be varied. However, in previous drivetrains, the housing may be redesigned to accommodate for the different gearbox layouts. The housing redesign process, may increase manufacturing complexity and, in some cases, production costs.

U.S. Pat. No. 9,789,754 B2 to Zhu et al. teaches a dual-motor vehicle system that utilizes a layshaft. At the layshaft, power from the both of the motors is combined and transmitted to downstream drive wheels. Zhu's system includes a synchronizer designed to shift between different gear ratios and a neutral position.

The inventor has identified several issues with Zhu's gearbox and other prior gearbox designs. Zhu's and other gearboxes may, for instance, be susceptible to component degradation and power delays when shifting transpires. Further, certain electric motors may be able to achieve a comparatively wide variance in output speed range, when compared to internal combustion engines, for example. Pairing these electric motors with shiftable transmission may add complexity and increase potential gearbox degradation modes.

To overcome at least some of the aforementioned challenges a vehicle product line is provided. The vehicle product line includes a first multi-stage gear train assembly with at least two stages. The product line further includes a second multi-stage gear train assembly with at least three stages and a different number of stages than the first multi-stage gear train assembly. A housing with a first section removably attached to a second section is additionally included in the product line. In the housing, the second section is configured to receive the first and second multi-stage gear train assemblies in different product arrangements. Providing a gearbox product line with a common housing enables manufacturing efficiency gains to be achieved while meeting a wider variation in gear ratios. Thus, the product line provides a wider range of fixed gear ratios for different end-users.

In another example, the multi-stage gear train assemblies each include a differential having an equivalent final drive ratio and the first multi-stage gear train assembly has an overall gear ratio that is less than the overall gear ratio of the second multi-stage gear train assembly. In this way, the product line may include a common final drive assembly while varying the overall gear ratio of the different gear trains. Consequently, the product line's manufacturing complexity can be further reduced and its end-use applicability can be further expanded.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3-9 are drawn approximately to scale. However, other relative dimensions may be used, in other embodiments.

DETAILED DESCRIPTION

A vehicle product line leveraging the use of a housing which packages multiple gearboxes with different ratios. The gearboxes include a varied number of layshafts to achieve the gear reduction ratio flexibility. The product line's applicability is expanded when these flexible ratio gearboxes are used while manufacturing procedures are simplified and manufacturing costs are driven down. In one example, one of the gearboxes may include a single layshaft and another gearbox may include multiple layshafts. In gearbox with multiple layshafts, the center distance between an input gear and a second layshaft may be selected to allow solely variations in the sizing of an input gear and idler gear to be varied to enable the ratio flexibility to be achieved, if wanted. However, gearboxes in the product line with additional gear variations lie within the scope of this disclosure.

In further examples, the different gearboxes may use common bearings, parking devices, and/or have similar final drive ratios to further decrease manufacturing complexity and manufacturing costs. Thus, the gearboxes may have overlapping components to harness economies of scale cost reductions. In further examples, the housing may form a portion of an electric beam axle assembly when the gearboxes are packaged therein. This electric beam axle construction enables further expansion of the vehicle product line's applicability due to the axle's packaging efficiency, increased reliability, and increased energy efficiency in comparison to electric vehicle (EV) powertrains with the motor spaced away from the drive axle(s).

Figure 1:
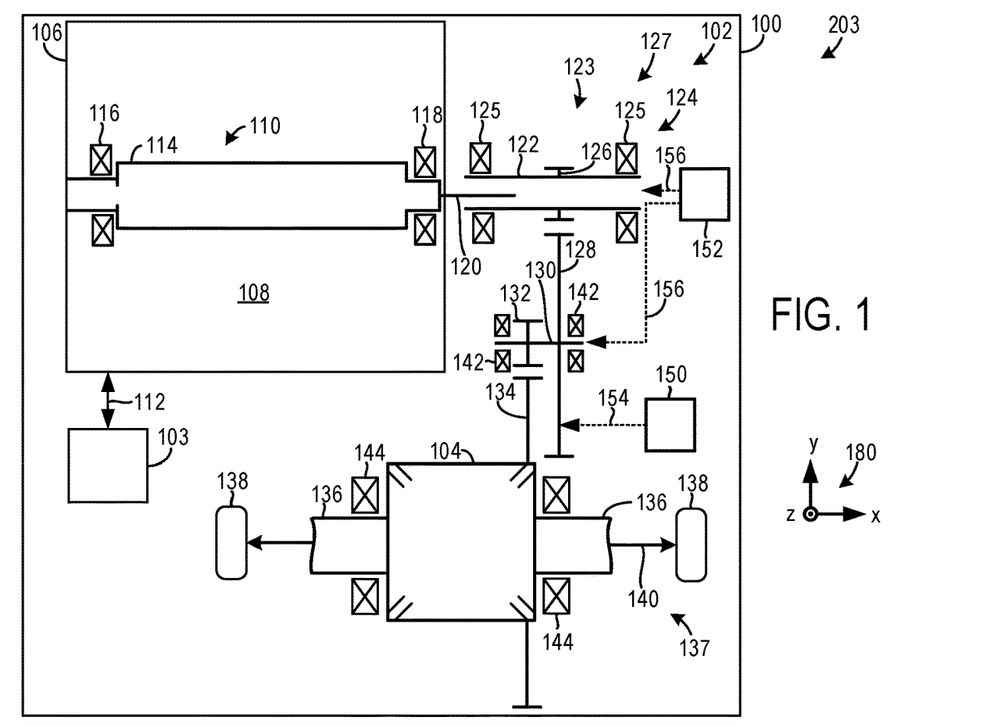
FIG. 1 is a schematic representation of a first electric axle assembly in a vehicle product line.
Figure 2:
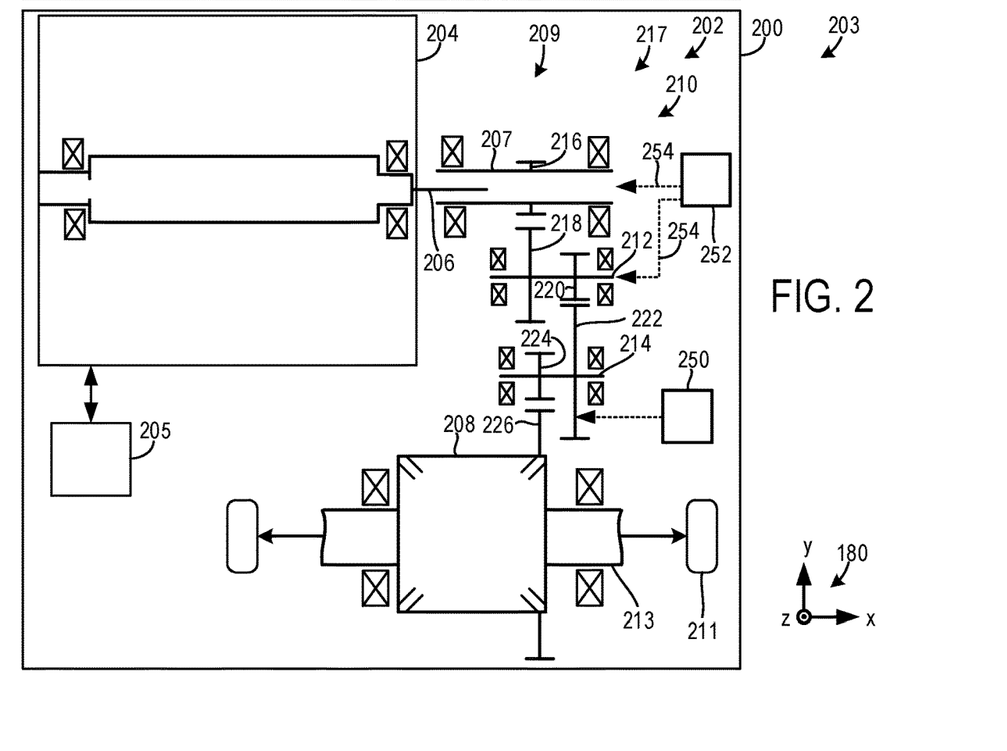
FIG. 2 is a schematic representation of a second electric axle assembly in the product line.
Figure 3:
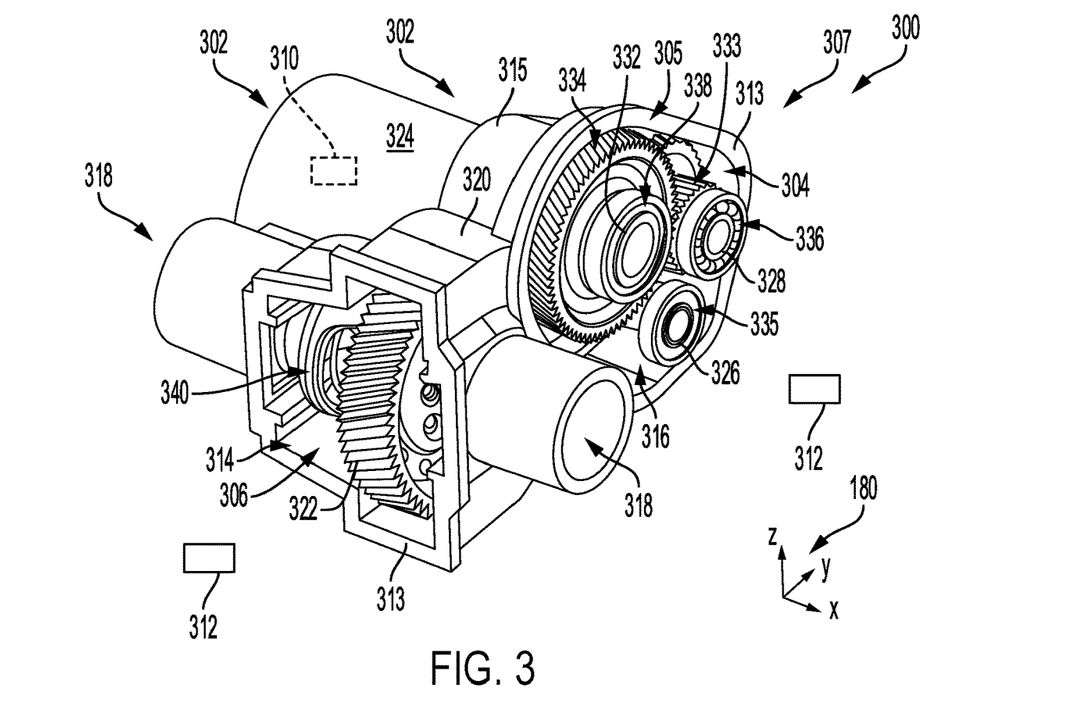
FIGS. 3 and 4 are perspective and side views of an exemplary illustration of the second electric axle assembly.
Figure 4:
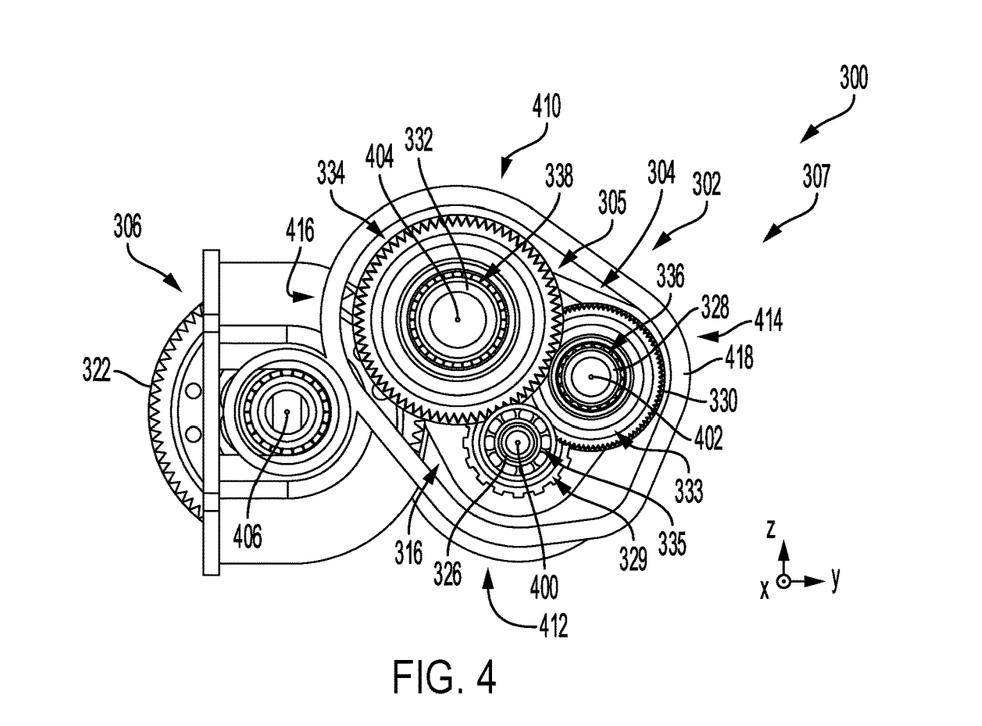
Figure 5:
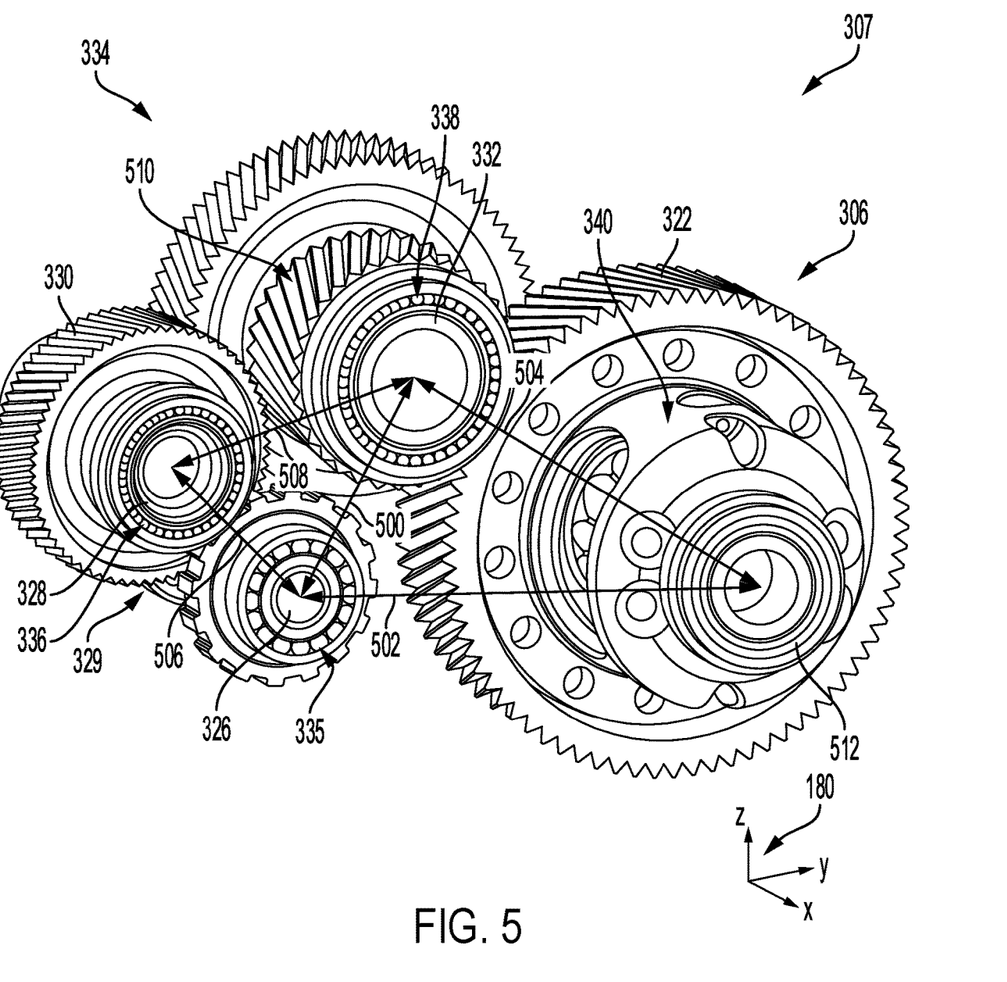
FIG. 5 is a detailed view of the gear train included in the example of the second electric axle assembly, depicted in FIGS. 3 and 4.
Figure 6:
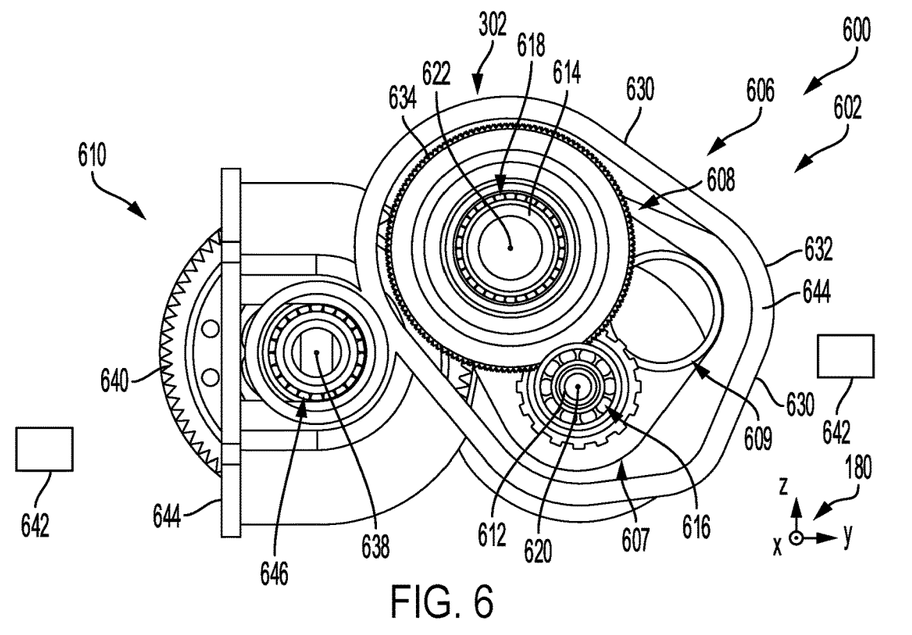
FIG. 6 is an exemplary illustration of the first electric axle assembly.
Figure 7:
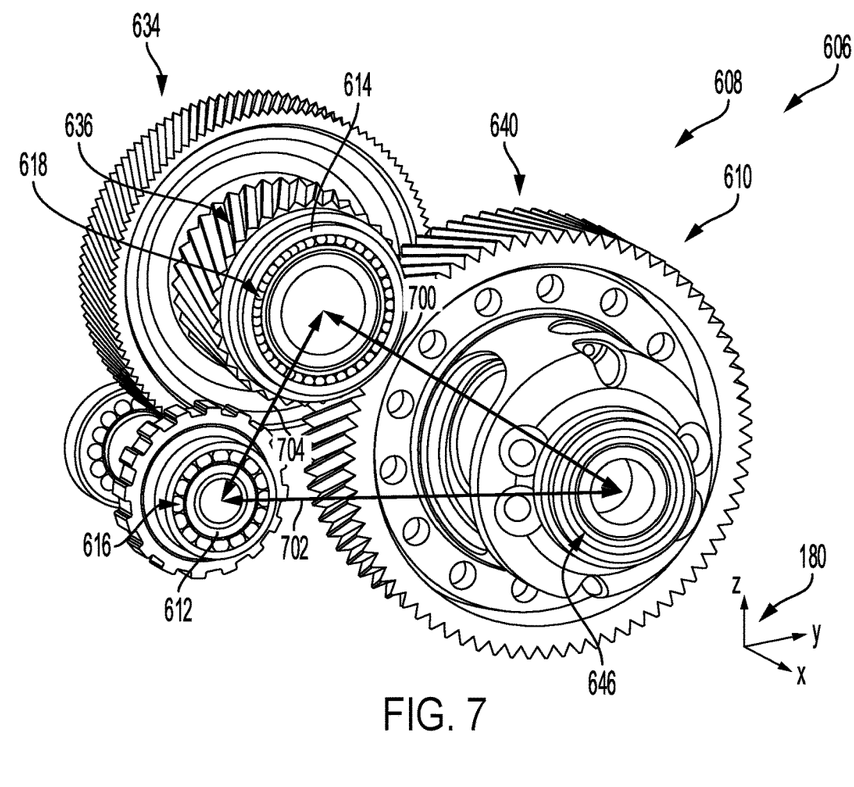
FIG. 7 is a detailed view of the gear train included in the example of the first electric axle assembly, depicted in FIG. 6.
Figure 8:
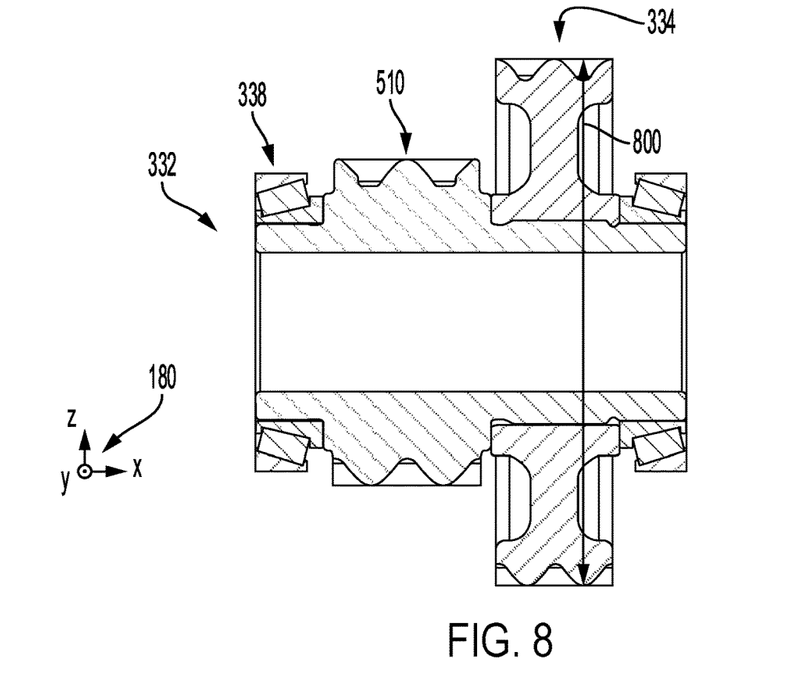
FIG. 8 is a detailed view of an intermediate shaft included in the gear train, depicted in FIG. 5.
Figure 9:
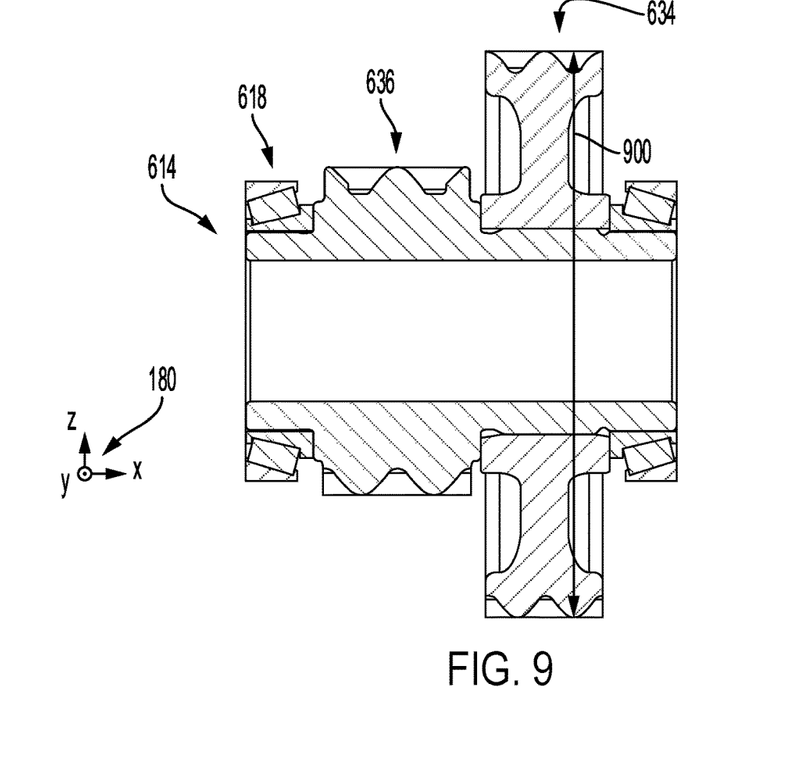
FIG. 9 is a detailed view of an intermediate shaft included in the gear train, depicted in FIG. 7.

FIGS. 1 and 2 schematically illustrate a first and a second drive axle system arrangement in a product line, the drive axles include gear trains which have different gear ratios designed to be packaged in a common housing. FIGS. 3-4 illustrate detailed views of an example of the second electric axle arrangement with multiple intermediate shafts providing a relatively high gear reduction. FIG. 5 illustrates the gear train included in the second electric axle arrangement. FIG. 6 shows an example of the first electric axle arrangement with a relatively low gear reduction and with one intermediate shaft packaged in a similar housing to the gear train in the second electric axle arrangement, shown in FIGS. 3-4. FIG. 7 depicts a detailed view of a gear train included in the second electric axle arrangement, shown in FIG. 6. FIGS. 8-9 show exemplary layshafts in the second and first electric axle arrangements.

FIG. 1 shows a schematic depiction of a vehicle 100 having a first example of an electric drive axle 102 that forms at least a portion of a vehicle drive train. The stick diagram of FIG. 1 provides a topology of the vehicle, drive axle, and corresponding components. The vehicle 100 may take a variety of forms, such as a light, medium, or heavy duty vehicle. Further, the vehicle may be a battery electric vehicle (BEV) where the internal combustion engine is omitted. Alternatively, the vehicle may be a hybrid elective vehicle with an internal combustion engine providing power to a battery or motive power to another drive axle. For instance, in one use-case hybrid vehicle configuration, the internal combustion engine may assist in recharging an energy storage device 103, during certain conditions. In another use-case hybrid vehicle configuration, the internal combustion engine may be configured to provide rotational energy to a differential 104 or other suitable locations in the gear train. In yet another use-case hybrid vehicle configuration, the engine may provide rotational input to another drive axle.

The electric drive axle 102 includes an electric motor-generator 106, although motors without regenerative capabilities have been contemplated. The electric motor-generator 106 includes a stator 108 and a rotor 110. The motor-generator 106 may be electrically coupled to the energy storage device 103 (e.g., battery, capacitor, combinations thereof, and the like). Arrows 112 signify the energy transfer between the electric motor-generator 106 and the energy storage device 103 that may occur during different modes of system operation. The electric motor-generator 106 may include conventional components for generating rotational output (e.g., forward and reverse drive rotational output) and/or electrical energy for recharging the energy storage device 103 such as a rotor electromagnetically interacting with a stator, to provide the aforementioned energy transfer functionality.

The motor-generator 106 includes a rotor shaft 114 with a first bearing 116 and a second bearing 118 coupled thereto. As described herein, a bearing is a device used to allow rotation of a shaft or other component. Roller bearings, ball bearings, thrust bearings, combinations thereof, and the like may be used. The bearings 116, 118 as well as the other bearings described herein may therefore include components such as inner races, outer races, roller elements (e.g., ball bearings, cylindrical rollers, tapered cylindrical rollers, etc.). Moreover, the size and/or configuration of at least a portion of the bearings may vary, in some cases. However, at least a portion of the bearings may have similar sizes and/or constructions. Factors such as shaft loading, expected shaft speed, gear sizing, packaging constraints, etc. may be taken into account when selecting the types of bearing used in the gear train.

The second bearing 118 is shown positioned within the electric motor-generator 106. However, other bearing arrangements with regard to the electric motor-generator have been contemplated such as bearing arrangements with alternative quantities, types, and/or locations.

An output shaft 120 extending from the rotor shaft 114 of the electric motor-generator 106 may be coupled to an input shaft 122. For instance, the output shaft 120 may be slip fit, mechanically attached, in splined engagement, etc. with an end of the input shaft 122.

Bearings 125 are coupled to the input shaft 122. As such, the bearings 125 support (e.g., axially and/or radially support) and facilitate rotation of the input shaft 122.

The electric drive axle assembly 102 include a gearbox 123 with a gear train 124 with multiple gears. To elaborate, the gear train 124 may have a fixed ratio with multiple stages. It will therefore be understood that the gear train 124 is included in a multi-stage gear train assembly 127. A stage in the gear train is formed by two differently sized gears drivingly connected to and meshing with one another. Providing a fixed ratio gear reduction decreases system complexity and increases system reliability.

The gear train 124 includes a first gear 126 coupled to the input shaft 122 and rotating therewith, a second gear 128 coupled to an intermediate shaft 130 and rotating therewith, and a third gear 132 coupled to the intermediate shaft 130 and rotating therewith. In the gear train 124, the first gear 126 meshes with the second gear 128. As described herein, a gear mesh is formed between mated gear teeth and enables power to be transferred between the meshed gears.

The third gear 132 meshes with a differential gear 134 (e.g., input ring gear) in a differential 104. The differential 104 is designed to allow for axle shaft speed differentiation. Axle shafts 136 are rotationally coupled to drive wheels 138, indicated by arrows 140.

The axle shafts 136 may form part of an axle 137. The axle 137 may be a beam axle, in one example. A beam axle, also referred to in the art as a solid axle or rigid axle, may be an axle with mechanical components structurally supporting one another and extending between drive wheels coupled to the axle. Thus, the camber angle between the wheels may remain substantially unchanged as the axle moves through its travel. For instance, the beam axle may be a structurally continuous axle spanning the drive wheels on a lateral axis, in one embodiment. In another embodiment, the beam axle may include co-axial shafts of the differential.

The differential 104 may include components such as a case housing gearing such as pinion gears, spider gears, etc. to achieve the aforementioned torque transfer functionality. To elaborate, the differential 104 may be an electronic locking differential, in one example. In another example, the differential 104 may be an electronic limited slip differential or a torque vectoring dual clutch. In other examples, an open differential may be used. Referring to the locking differential example, when unlocked, the locking differential may allow the drive wheels 138 to spin at different speeds and conversely, when locked, the locking differential may force the drive wheels to rotate at the same speed. In this way, the transmission configuration can be adapted to increase traction under certain driving conditions. In the case of the limited slip differential, the differential allows the deviation of the speed between shafts 136 coupled to the drive wheels 138 to be constrained. Bearings 142 are coupled to the intermediate shaft 130 which support and facilitate rotation of the shaft. Bearings 144 are coupled to the axle shafts 136.

The power path through the first electric drive axle may travel from the motor's output shaft 120 to the first gear 126, from the first gear to the second gear 128, from the second gear to the third gear 132, from the third gear to the differential gear 134, and through the differential 104 and axle shafts 136 to the drive wheels 138.

The overall ratio of the gear train 124 may be less than or equal to 10:1, in one example. In this way, the gear train may provide a relatively low gear ratio which may suite a variety of end-use applications. Specifically, in one example, overall ratio of the gear train may be between 10:1 and 5:1. This range may be particularly desirable for motors with relatively lower operating speeds.

FIG. 1 schematically depicts a parking system 150 and a lubrication system 152. The parking system 150 may be designed to substantially prevent motion of the gear train via components such as an electronic and/or hydraulic actuator, a shift collar, a parking pawl, etc. used to accomplish this functionality, indicated via arrow 154. The lubrication system 152 is configured to deliver lubricant (e.g., oil) to gearbox components such as bearings 125, 142, and/or 144 as well as the interface between the first gear 126 and the second gear 128 and the interface between the third gear 132 and the differential gear 134. Arrows 156 indicate spray bars that may be used to lubricate the gears, although other types of components for routing lubricant to the gears such as splash lubrication devices may additionally or alternatively be utilized.

FIG. 2 shows a schematic depiction of a vehicle 200 having a second example of an electric drive axle 202 that again forms at least a portion of a vehicle drive train. The second example of the electric drive axle assembly 202, shown in FIG. 2, and the first example of the electric drive axle assembly 102 may be included in a vehicle product line 203. In the product line, common components may be retained between the electric drive axle assemblies 102, 202 to reduce manufacturing complexity and cost. The shared components may include a housing (e.g., housing 302, shown in FIGS. 3 and 6) that is profiled to accommodate both the single and dual layshaft gear trains. The components which may be shared between the electric drive axle assemblies in the product line may further include bearings, parking devices, and/or the final drive gear reduction. Using these overlapping components allows multiple product arrangements to use several identical components, decreasing manufacturing complexity across the product line.

Continuing with FIG. 2, the electric drive axle assembly 202 again includes an electric motor-generator 204 with an output shaft 206 coupled to an input shaft 207, an energy storage device 205, a differential 208, axle shafts 213, and drive wheels 211. As indicated above, these components may share a similar form and/or function with the associated components described with regard to FIG. 1. Redundant description of these components is omitted for concision.

The electric drive axle 202 further includes a gearbox 209 with a gear train 210. The gear train 210 in the second example of the electric drive axle assembly 202 includes multiple intermediate shafts (a first intermediate shaft 212 and a second intermediate shaft 214) and the input shaft 207. It be understood that the gear train 210 is included in a multi-stage gear train assembly 217. The input shaft 207 again includes a first gear 216. It will be understood, that the first gear 216 may be sized differently from the first gear 126, depicted in FIG. 1.

Continuing with FIG. 2, the first intermediate shaft 212 includes a second gear 218 that meshes with the first gear 216 and a third gear 220 that meshes with a fourth gear 222 on the second intermediate shaft 214. A fifth gear 224 resides on and is rotationally coupled to the second intermediate shaft 214, in the illustrated example. Further, as shown in FIG. 2, the fifth gear 224 is coupled to a differential gear 226.

In a drive mode, the power path through the gear train 210 starts at the motor-generator 204, travels from the first gear 216 to the second gear 218 on the first intermediate shaft 212, from the second gear to the third gear 220 by way of the first intermediate shaft, from the third gear to the fourth gear 222. The power path continues through the second intermediate shaft 214 to the fifth gear 224, from the fifth gear to the differential gear 226, and to the axle shafts and subsequently the drive wheels 211 by way of the differential.

The overall ratio of the gear train 210 may be greater than 10:1, in one example. In this way, the gear train may provide a relatively high gear ratio which may suite a variety of end-use applications. Specifically, in one example, overall ratio of the gear train may be between 11:1 and 20:1. This range may be particularly desirable for motors with relatively higher operating speeds.

An axis system 180 is also provided in FIG. 1 as well as FIGS. 2-9, for reference. In one example, the z-axis may be parallel to a vertical axis (e.g., gravitational axis), the x-axis may be a lateral axis, and the y-axis may be a longitudinal axis. However, other orientations of the axes may be used, in other examples.

FIG. 2 again schematically depicts a parking system 250 and a lubrication system 252. The parking system 250, shown in FIG. 2, may be similar to the parking system 150, shown in FIG. 1. Likewise, the lubrication system 252, shown in FIG. 2, may be similar to the lubrication system 152, shown in FIG. 1. To elaborate, spray bars 254 may be similar to spray bars 156, shown in FIG. 1. The allocation of similar components across the product line gearboxes allows manufacturing efficiency to be increased, which may in turn decrease manufacturing costs.

Further in some examples, the differential 208 may have a final drive ratio that is equivalent to a final drive ratio of the differential 104, shown in FIG. 1. The final drive ratio may be selected based on the motor's speed range, efficiency curves, vehicle performance targets, etc. For instance, the final drive ratio may be between 2:1 and 6:1, however numerous suitable ranges are possible. Again, manufacturing efficiency gains may further increased when the gearboxes in the product line share common components.

FIG. 3 shows a perspective view of an example 300 of the second electric drive axle, shown in FIG. 2. The second electric drive axle 300 may include a housing 302, a gearbox 304 with a gear train 305, and a differential 306. It will be appreciated that the gear train 305 may be included in a multi-stage gear train assembly 307.

The housing 302 may have a clamshell construction which encloses the gear train 305, the differential 306, and a motor schematically depicted at 310. Access panels, schematically depicted at 312, may provide efficient access to the gearbox 308, differential 306, and/or the motor 310, in the clamshell construction embodiment. The access sections 312 (e.g., access panels) may be mechanically attached (e.g., attached via bolts, screws, clamps, etc.,) or otherwise removably coupled to flanges 313 in a central section 315 of the housing 302. The housing 302 specifically includes an interior enclosure 314 that at least partially surrounds the differential and an interior enclosure 316 that at least partially surrounds the gear train 305. Axle shaft openings 318 may be further included in the housing 302. The axle shaft openings may be cylindrical in profile and extend away from the differential gear 322. The housing 302 may further include a differential protrusion 320 that extends in opposing directions along the z-axis to enable the differential gear 322 to be efficiently packaged in the housing. Additionally, the housing 302 may include a cylindrical section 324 that is profiled to house the motor-generator.

The gear train 305 includes an input shaft 326 rotationally coupled to an output shaft of an electric motor-generator. The input shaft 326 is rotationally coupled to a first intermediate shaft 328 via a first gear 329 and second gear 330, shown in FIG. 5. Continuing with FIG. 3, the first intermediate shaft 328 may be rotationally coupled to a second intermediate shaft 332 which is rotationally coupled to the differential gear 322.

FIG. 3 further illustrates a third gear 333 on the first intermediate shaft 328 meshing with a fourth gear 334 on the second intermediate shaft 332. As previously discussed, a fifth gear on the second intermediate shaft meshes with the differential gear 322.

Bearings 335, 336, 338 are coupled to the input shaft 326, first intermediate shaft 328, and the second intermediate shaft 332. The bearings 335 are depicted as ball bearings and the bearings 336, 338 are depicted as roller bearings, although the types of bearings deployed in the gear train may be varied based on expected gear speed ranges, gear sizes, expected gear and shaft loading, etc.

A case 340 of the differential 306 is further illustrated and may hold spider gears that drive side gears that are rotationally attached to axle shafts. However, alternate types of differential arrangements lie within the scope of this disclosure.

FIG. 4 shows a side view of the electric drive axle 300 with the multi-stage gear train assembly 307, shown in FIG. 3. The housing 302 and the gearbox 304 with the gear train 305 are again illustrated along with the input shaft 326, the first intermediate shaft 328, the second intermediate shaft 332, gears 329, 330, 333, 334, bearings 335, 336, 338 and differential gear 322 of the differential 306.

Rotational axes 400, 402, 404, 406 of the input shaft 326, the first intermediate shaft 328, and the second intermediate shaft 332, and the differential 306, respectively, are depicted. These rotational axes may each have varying vertical positions along the z-axis to enable the gears in the gear train assembly 307 to be efficiently packaged in the interior enclosure 316 of the housing 302. Specifically, in one example, the rotational axes 402, 404 of the first and second intermediate shafts 328, 332, respectively, may be positioned vertically above the rotational axis 406 of the differential 306 and the rotational axis 400 of the input shaft 326 may be positioned vertically below the differential's rotational axis. Arranging the axes in this manner may enable the gear train to achieve a desired gear ratio while maintaining an acceptable level of packaging efficiency. However, the axes may have other relative positions, in other examples. The differential's rotational axis 406 may further be axially offset from the output shaft's rotational axis 400 to further increase packaging efficiency and concentrate a greater amount of mass near the center of the vehicle which may enhance vehicle handling performance.

The housing 302 includes an upper side 410, a lower side 412, and lateral sides 414, 416. The lateral side 414 may include a curved section 418 that is contoured to accommodate for packaging of the first intermediate shaft 328 and the gears that reside thereon. The radius of the curvature of section 418 may be similar to the radius of curvature of the gear 330. In this way, the housing may efficiently package the gearing. However, other housing profiles lie within the scope of this disclosure.

Turning to FIG. 5, it shows the multi-stage gear train assembly 307 with the housing removed to reveal the internal gear stages. The input shaft 326, the first intermediate shaft 328, the second intermediate shaft 332, and the differential 306 are again shown along with gears 329, 330, 333, 334 and bearings 335, 336, 338 are again illustrated.

A center distance between the input shaft 326 and the second intermediate shaft 332 is indicated at 500. This center distance may be selected (e.g., optimized) so that for the single intermediate shaft axle assembly, shown in FIG. 6, the size of the gear 329 and the gear 333, shown in FIGS. 3 and 4, may only need to be changed to achieve a variation in gear ratio between the gear trains.

FIG. 5 further shows a center distance 502 between the input shaft 326 and the second intermediate shaft 332, a center distance 502 between and the differential 306 and the input shaft, and a center distance 504 between the differential and the second intermediate shaft 332. A center distance 506 between the first intermediate shaft 328 and the input shaft 326 as well as a center distance 508 between the first intermediate shaft 328 and the second intermediate shaft 332 is further illustrated.

FIG. 5 additionally includes a fifth gear 510 meshing with the differential gear 322. A differential bearing 512 allowing for rotation of an axle shaft passing through the case 340. It will be appreciated that the differential gear 322 drives rotation of the case which rotates spider gears meshing with side gears that are rotationally coupled to axle shafts.

FIG. 6 shows an example 600 of the first electric drive axle with a first multi-stage gear train assembly 602, shown in FIG. 1. The first multi-stage gear train assembly 602 may include a housing 302, a gearbox 606 with a gear train 608, and a differential 610, similar to the second gear train assembly.

As shown in FIG. 6 the gear train 608 includes an input shaft 612 and one intermediate shaft 614, differing from the second gear train assembly, shown in FIGS. 3-5. The housing 302, shown in FIG. 6, however, is identical in profile and sizing to the housing 302 shown in FIGS. 3-4. In this way, a common housing is used across different assemblies in the vehicle product line. This enables manufacturing of the different assemblies in the product line to be simplified and costs to be reduced, if desired. Bearings 616, and 618 may again be coupled to the input shaft 612 and the intermediate shaft 614 and may be identical to the bearings 335, 337, shown in FIGS. 3-5. In this way the product line's manufacturing process may be further simplified.

Rotational axes 620, 622, 638 of the input shaft 612, the intermediate shaft 614, and the differential 610 are additionally depicted. The axes 620 and 638 may be similarly positioned in relation to the axes 400, 406 shown in FIG. 4, allowing these gear train assemblies to have additional overlapping features.

The housing 302 includes an interior enclosure 607 with a section 609 devoid of gears or shafts, which in the other gear train assembly, shown in FIGS. 3-5, houses an intermediate shaft and corresponding gears. The section 609 of the interior enclosure 607 extends away from the differential in a direction parallel to the y-axis. The section 609 may be bounded via two sidewalls 630 that join at a bend 632 in the wall of the housing.

An input gear 634 and an output gear 636, shown in FIG. 7, resides on the intermediate shaft 614. As previously discussed, the input gear 634 on the intermediate shaft meshes with a gear on the input shaft 612. The differential gear 640 designed to rotate about axis 638 is further illustrated. Housing sections, schematically illustrated at 642, may attach to flanges 644 to enclose the stages in the gearbox. A differential bearing 646 is additional shown in FIG. 6, with similar functionality and structure to the previously described differential bearing.

FIG. 7 illustrates the first multi-stage gear train assembly 602 with the housing removed to reveal the internal gear stages. The input shaft 612, the intermediate shaft 614, and the differential 610 are again shown along with gears 634, 636 and bearings 616, 618, 646 are again illustrated.

A center distance 700 between the differential 610 and the intermediate shaft 614, a center distance 702 between the differential 610 and the input shaft 612, and a center distance 704 between the input shaft 612 and the intermediate shaft 614 are depicted in FIG. 7.

FIGS. 8 and 9 shows the first intermediate shafts 332 and 614, respectively. The gears 334, 510 are shown arranged on the intermediate shaft 332 and the gears 634, 636 are shown arranged on the intermediate shaft 614. Bearings 338, 618 are further shown coupled to shafts 332 and 614, respectfully.

As shown, the gear 634 has a greater diameter 900 than the diameter 800 of the gear 334 to facilitate an efficient ratio swap between the different gear train assemblies in the product line. The gears 634, 334 may be press fit to the corresponding shaft, to enable an efficient gear stage ratio adjustment.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a vehicle product line is provided that comprises a first multi-stage gear train assembly including at least two stages; a second multi-stage gear train assembly including at least three stages and a different number of stages than the first multi-stage gear train assembly; and a housing including a first section removably attached to a second section; wherein the second section is configured to receive the first and second multi-stage gear train assemblies in different product arrangements.

In another aspect, a vehicle product line is provided that comprises a first multi-stage gear train assembly with a fixed gear ratio and including: one intermediate shaft with a gear coupled thereto and configured to form a mesh with a gear on a first input shaft and a gear in a first differential; a second multi-stage gear train assembly with a fixed gear ratio and including: a first intermediate shaft with a gear coupled thereto and configured to form a mesh with a gear on a second input shaft; and a second intermediate shaft with a gear coupled thereto and configured to form a mesh with a gear in a second differential; and a housing including a first section removably attached to a second section; wherein the second section is configured to receive the first multi-stage gear train assembly in a first solid beam axle arrangement and the second multi-stage gear train assembly in a second solid beam axle arrangement.

In any of the aspects or combinations of the aspects, the first and second multi-stage gear train assemblies may include a first differential and a second differential, respectively, that may be each designed to rotationally couple to a pair of axle shafts.

In any of the aspects or combinations of the aspects, an overall gear ratio of the first multi-stage gear train assembly may be less than an overall gear ratio of the second multi-stage gear train assembly.

In any of the aspects or combinations of the aspects, the vehicle product line may further comprise an electric motor-generator designed to rotationally couple to the first and second multi-stage gear train assemblies, wherein the electric motor-generator, when separately assembled with each of the first and second multi-stage gear train assemblies, is axially offset from the first differential and the second differential.

In any of the aspects or combinations of the aspects, an overall gear ratio of the first multi-stage gear train assembly may be greater than 10:1 and an overall gear ratio of the second multi-stage gear train assembly may be less than 10:1.

In any of the aspects or combinations of the aspects, when assembled in the housing, the first multi-stage gear train assembly and the second multi-stage gear train assembly may each form a beam axle.

In any of the aspects or combinations of the aspects, the first multi-stage gear train assembly and the second multi-stage gear train assembly may have an equivalent final drive ratio.

In any of the aspects or combinations of the aspects, the first and second multi-stage gear train assemblies may each include a parking system designed to prevent rotation of the corresponding multi-stage gear train assembly.

In any of the aspects or combinations of the aspects, the first multi-stage gear train assembly may include a first lubrication system with a first set of spray bars and the second multi-stage gear train assembly may include a second lubrication system with a second set of spray bars.

In any of the aspects or combinations of the aspects, the first multi-stage gear train assembly may include a single intermediate shaft and the second multi-stage gear train assembly includes two intermediate shafts.

In any of the aspects or combinations of the aspects, the product line, which may be a vehicle line, a transmission line, an axle line, etc., may further comprise an electric motor-generator configured to rotationally couple to the first and second multi-stage gear train assemblies and wherein the housing is configured to enclose the electric motor-generator.

In any of the aspects or combinations of the aspects, the first differential may be axially offset from the electric motor-generator in the first solid beam axle arrangement and the second differential may be axially offset from the electric motor-generator in the second solid beam axle arrangement.

In any of the aspects or combinations of the aspects, the first multi-stage gear train assembly may have an overall gear ratio between 5:1 and 10:1 and the second multi-stage gear train assembly may have an overall gear ratio between 11:1 and 20:1.

In any of the aspects or combinations of the aspects, the first and second multi-stage gear train assemblies may each include a parking system that are substantially identical to one another.

In any of the aspects or combinations of the aspects, a final drive ratio of the first differential and the second differential may be equivalent.

In any of the aspects or combinations of the aspects, the first multi-stage gear train assembly may include a first set of bearings coupled to the one intermediate shaft and the second multi-stage gear train assembly may include a second set of bearings coupled to the first intermediate shaft and similar to the first set of bearings.

In any of the aspects or combinations of the aspects, when the first and second multi-stage gear train assemblies are separately installed in the housing, the first input shaft and the second input shaft may have a common rotational axis and the first and second differentials have a common rotational axis.

In any of the aspects or combinations of the aspects, the housing may include a flange circumferentially surrounding the first multi-stage gear train assembly in the first solid beam axle arrangement and the second multi-stage gear train assembly in the second solid beam axle arrangement.

In any of the aspects or combinations of the aspects, when the first and second multi-stage gear train assemblies are separately installed in the housing, the housing may circumferentially enclose each of the gears in the respective multi-stage gear train assembly.

In another representation, an electric axle product line is provided with a clamshell housing profiled to enclose a first gear reduction with a single idler shaft and a second gear reduction with multiple idler shafts that when assembled form separate gear reduction products.

As used herein, the term "approximately" is construed to mean plus or minus five percent of the range unless otherwise specified.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

It will be appreciated that the configurations disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A product line comprising:
   a housing configured to house a first product or a second product; and
   the first product including a first multi-stage gear train assembly that includes a first plurality of stages that includes multiple gears that rotate on a first intermediate shaft, a second intermediate shaft, and a first differential; and
   the second product including a second multi-stage gear train assembly including a second plurality of stages that has a fewer number of stages than the first plurality of stages, wherein the second plurality of stages include multiple gears that rotate on an intermediate shaft and a differential of the second multi-stage gear train assembly;
   wherein a center distance between a rotational axis of the first intermediate shaft and a rotational axis of the first differential of the first multi-stage gear train assembly is equivalent to a center distance between a rotational axis of the intermediate shaft and a rotational axis of the differential of the second multi-stage gear train assembly, and wherein the housing forms a portion of an electric beam axle assembly and comprises axle shaft openings.

2. The product line of claim 1, wherein:
   the first multi-stage gear train assembly includes a first input shaft and the second multi-stage gear train assembly includes a second input shaft; and
   a center distance between a rotational axis of the first input shaft and the first intermediate shaft and a center distance between a rotational axis of the second input shaft and the second intermediate shaft are equivalent.

3. The product line of claim 1, wherein:
   the first product includes a first housing that encloses the first multi-stage gear train assembly and the second product includes a second housing that encloses the second multi-stage gear train assembly; and
   the first housing and the second housing have an identical shape and size.

4. The product line of claim 1, wherein the first and second products are beam axles that are designed to maintain constant camber angles of drive wheels as the beam axles move through their travel.

5. The product line of claim 1, wherein the first differential has a different final drive ratio than the second differential.

6. The product line of claim 1, wherein:
at least one of the gears on the first intermediate shaft is press fit onto the first intermediate shaft; and
at least one of the gears on the intermediate shaft of the second multi-stage gear train assembly is press fit onto the intermediate shaft of the second multi-stage gear train assembly.

7. The product line of claim 1, wherein the first differential and the second differential are electronic locking differentials, and wherein the housing comprises a differential protrusion that extends in opposite directions normal to an axis along which the axle shaft openings extend.

8. The product line of claim 1, wherein:
the first product includes a first lubrication system and the second product includes a second lubrication system; and
the first and second lubrication systems are identical.

9. The product line of claim 1, wherein:
the first product includes a first parking system and the second product includes a second parking system; and
the first and second parking systems are identical.

10. The product line of claim 1, wherein the first differential and the second differential are open differentials.

11. A product line comprising:
a housing configured to house a first product and a second product;
the first product including a first multi-stage gear train assembly that includes a first plurality of stages that includes multiple gears that rotate on a first input shaft, first intermediate shaft, a second intermediate shaft, and a first differential; and
a second product including a second multi-stage gear train assembly including a second plurality of stages that has a fewer number of stages than the first plurality of stages, wherein the second plurality of stages include multiple gears that rotate on an intermediate shaft of the second product, and a second differential;
wherein a center distance between a rotational axis of the first intermediate shaft and a rotational axis of the first differential or the first input shaft and a center distance between a rotational axis of the intermediate shaft of the second product and a rotational axis of the second differential or second input shaft are equivalent, and wherein the housing comprises a cylindrical section that is profiled to house a motor-generator.

12. The product line of claim 11, wherein the center distances between the rotational axis of the first intermediate shaft and the rotational axes of the first differential and first input shaft and the center distances between the rotational axis of the intermediate shaft of the second product and the rotational axes of the second differential and second input shaft are equivalent.

13. The product line of claim 11, wherein final drive ratios of the first differential and the second differential are not equivalent.

14. The product line of claim 13, wherein the final drive ratios are in the range between 2:1 and 6:1.

15. The product line of claim 11, wherein:
the first product includes a first lubrication system and the second product includes a second lubrication system;
the first and second lubrication systems are identical;
the first product includes a first parking system and the second product includes a second parking system; and
the first and second parking systems are identical.

16. The product line of claim 11, wherein:
a first bearing and a second bearing are coupled to opposing ends of the first intermediate shaft;
a third bearing and a fourth bearing are coupled to opposing ends of the intermediate shaft of the second product; and
the first, second, third, and fourth bearings are identical.

17. The product line of claim 16, wherein the first, second, third, and fourth bearings are roller bearings.

18. The product line of claim 11, wherein the first differential and the second differential are electronic locking differentials or electronic limited slip differentials.

19. The product line of claim 11, wherein the first and second products are beam axles that axially extend between drive wheels.

20. The product line of claim 11, wherein the first multi-stage gear train assembly has an overall gear ratio that is less than 10:1 and the second multi-stage gear train assembly has an overall gear ratio that is greater than 10:1.

* * * * *